United States Patent Office 2,843,624
Patented July 15, 1958

2,843,624

RECOVERY PROCESS FOR ESTER CONDENSATION PRODUCTS

Werner C. Muller, Roslyn, N. Y., and Franklyn D. Miller, Cincinnati, Ohio, assignors to National Distillers and Chemical Corporation, a corporation of Virginia No Drawing. Application December 30, 1955
Serial No. 556,461

2 Claims. (Cl. 260—483)

The present invention relates to an improved process for separating and recovering condensation products of esters of the aliphatic series, such as condensation products of certain alkyl esters of aliphatic monocarboxylic acids. More particularly, the invention relates to a process for separation and recovery of ethyl acetoacetate from reaction mixtures obtained by condensation of ethyl acetate with a suitable condensation agent, and particularly, with suitable alkali metal-containing condensation agents.

As is known to those skilled in the art, certain esters of the aliphatic series, such as those having hydrogen on the $\alpha$-carbon atom, may be reacted with a suitable base (i. e., condensation agent) to produce condensation products of the esters. In specific illustration, ethyl acetoacetate may be produced by condensing ethyl acetate with a suitable condensation agent, including sodium-containing agents such as for example, sodium, sodium alcoholates, sodamide and others. From such condensation reactions, reaction mixtures are obtained which, in addition to the metal salt of the condensation product, contain unreacted ester reactant, alcohol and other materials including tars, etc. Thus, and illustrated by the condensation reaction of ethyl acetate with sodium for preparation of ethyl acetoacetate, and in which reaction the ethyl acetate is used in excess amounts, reaction mixtures are obtained which, in addition to the sodium salt of ethyl acetoacetate, contain ethanol and a substantial amount of ethyl acetate.

For recovery of the desired condensation product from reaction mixtures of such condensation reactions, the reaction mixtures may be neutralized such as by treatment thereof with aqueous acid solutions whereby the metal derivative of the condensation product in the reaction mixture is neutralized. For such a purpose, mineral acids may be employed including sulfuric acid, phosphoric acid, and hydrochloric acid, as well as other neutralizing agents such as carbon dioxide and the like. In use of neutralizing agents in relatively dilute form, the neutralized mixture forms an aqueous phase and an oil phase whereas, in the use of more concentrated neutralizing agents, there additionally occurs precipitation of the salt formed by the neutralization reaction. While methods that may be employed for recovery of the desired condensation product (e. g., ethyl acetoacetate) from the neutralized reaction mixtures may vary somewhat in details, their recovery has generally been effected by a procedure on the order of the following.

When the neutralization agent employed is either a dilute acid solution or a more concentrated acid solution, the resulting aqueous layer is separated from the oil layer and the water layer or the salt that separates out is extracted with a suitable material such as acetic ether. The oil layer and the acetic ether extract may then be washed with a dilute alkaline solution (e. g., sodium carbonate) to remove any acidity that may be present. The thus washed oil and acetic ether extracts are then dried by suitable means (e. g., anhydrous sodium sulfate, Drierite, etc.) following which the condensation product is removed by fractionation, including a vacuum distillation to prevent decomposition of the acetoacetic ester, of the dry oil phase and acetic ether extract. Recovery of the ethyl acetate from the aqueous layer, from which the acetoacetic ester has been extracted, may be carried out by steam distillation, or other suitable means, to recover an azeotrope of ethyl acetoacetate and water.

In such processes for separation and recovery of the condensation product from the neutralized reaction mixtures, it is difficult to exactly neutralize the reaction mixture. For example, the reaction mixture is normally of dark color whereby exact determination of the neutral point by use of ordinary pH indicators is precluded. Additionally, separation of the two layers or the solid phase that is formed increased the difficulty of attaining the point of true neutrality irrespective of the means employed for measurement of pH. Accordingly, in the recovery of the desired condensation product by subsequent distillation of a component or components, such as the oil phase, of the neutralized condensation reaction mixture, the distillation is normally carried out in the presence of either one or more of the following: free acid, free alkali (e. g., sodium hydroxide or sodium carbonate), acid salts of sodium, such as sodium bisulfate, acid phosphates, etc., or other salts. As the distillation progresses, the concentration of the acid or salt increases as, generally, neither is volatilized during the distillation. Under such conditions, loss of the desired condensation product tends to occur as such condensation products, including ethyl acetoacetate, tend to undergo decomposition when heated to elevated temperatures in the presence of acidic or basic substances. Additional loss of desired condensation product tends to occur as small amounts of the salt, formed in the neutralization treatment, generally dissolve in the oil phase and during distillation of that phase the salts are concentrated and induce decomposition of the desired condensation product.

In order to recover the volatile components with minimization of loss of desired condensation product and valuable by-products (e. g., alcohol product from the condensation) from neutralized reaction mixtures derived from processes as aforedescribed, it has been customary to separately distill the oil phase and the water phase. For example, in the reaction of ethyl acetate under conditions for production of ethyl acetoacetate wherein the ethyl acetate reactant is employed in excess amount, complete recovery of unreacted ethyl acetate substantially devoid of ethyl acetoacetate, or of ethyl acetoacetate devoid of ethyl acetate, has been difficult to obtain due mainly to difficulties encountered in completely distilling the ethyl acetate from the oil layer prior to vacuum distillation of said layer. For example, difficulty in complete removal of the ethyl acetate from the oil layer (ethyl acetoacetate) is encountered as, in the absence of vacuum distillation, the temperatures, required to boil out the ethyl acetate as the concentration thereof is reduced are generally sufficiently high to induce decomposition of the ethyl acetoacetate. On the other hand, use of vacuum distillation renders it difficult to condense the ethyl acetate boiled out of the oil layer whereby losses of ethyl acetate are encountered in the condensing system. Moreover, the aqueous phase contains, in addition to ethyl acetate, by-product alcohol (ethanol) and, hence, is separately treated to recover ethanol and ethyl acetate therefrom.

It has now been discovered that a neutralized condensation reaction mixture such as those aforedescribed may be subjected to a novel treatment as is described more fully hereinafter without encountering difficulties attendant to such heretofore employed methods for highly effective separation and recovery of desired constituents of the condensation reaction mixtures including the desired condensation product as well as unreacted ester reactant. In accordance with this invention, a neutralized starting mixture such as aforedefined is subjected to a distillation treatment under conditions whereby all of the valuable components of the neutralized reaction mixture are recovered without need for resort to separation of the phases that result from the neutralization treatment, without need for separate distillation of such phases, and without need for vacuum distillation of mixtures of the desired condensation product with the unreacted ester reactant. In addition to effecting substantially complete recovery of the desired condensation product, an advantage of the process embodied herein is that the unreacted ester reactant is also recovered substantially completely.

In broad aspect the process of this invention comprises subjecting a neutralized reaction mixture as aforedescribed to distillation in the presence of water under conditions whereby the neutralized reaction mixture is resolved into a mixture comprising water, unreacted ester and alcohol, and an aqueous solution of the desired condensation product and the salt formed in the neutralization treatment and present in the neutralized reaction mixture. Thus, in practice of the invention, the separation treatment is carried out in presence of water in amount sufficient for recovery of the desired condensation product and salt as an aqueous solution. With respect to such a distillation, carried out in presence of water and the salt formed in the neutralization, sufficient water may in some instances be present as a result of the aqueous acid solution employed in the neutralization treatment but, in most cases, it is either necessary or desirable to supply additional dilution water in the distillation treatment. Such dilution water may be and is preferably supplied in the form of steam employed for distillation of the neutralized reaction mixture as is described more fully hereinafter.

More specifically, it has been found that a neutralized reaction mixture as aforedescribed may be subjected to treatment in a distillation zone wherein control is exercised over the stripping ratio in one portion of said zone and also over the reflux ratio in another portion of said zone. As employed herein, the term "molar reflux ratio" designates the mols of liquid downflow divided by mols of overhead product from column, and the term "molar stripping ratio" designates the mols of liquid downflow divided by the mols of vapor upflow in the stripping zone. By proper control of the distillation treatment, the desired condensation product may be recovered substantially completely and substantially devoid of unreacted ester reactant and alcohol present in the neutralized mixture subjected to the distillation treatment. In illustration, and by use of a starting mixture comprising ethyl acetoacetate, sodium sulfate, ethyl acetate and ethanol prepared by neutralization with dilute sulfuric acid of a mixture prepared by conventional condensation of excess ethyl acetate with sodium to prepare sodio ethyl acetoacetate, the neutralized reaction mixture is subjected to distillation in a vertically disposed distillation zone. In accordance with an embodiment of this invention, the reflux ratio in the upper portion of the distillation zone and the stripping ratio in the bottom portion of said distillation zone are controlled such as to provide for separation of ethanol and ethyl acetate from the ethyl acetoacetate whereby ethanol and ethyl acetate are taken off overhead as a mixture with water, and ethyl acetoacetate is recovered as a bottoms product in the form of an aqueous solution with the salt present in the starting neutralized mixture. As to the control exercised over the reflux ratio in the upper portion of the distillation zone, use of too low a reflux ratio forces desired condensation product into the overhead. As to the stripping ratio in the lower section of the distillation zone, use of a stripping ratio that is too low will result in undesired accumulation of condensation product in the upper portion of the stripping zone whereas too high a stripping ratio will result in alcohol passing out with the condensation product in the bottoms fraction. Thus, adequate controls are exercised over the reflux ratio and stripping ratio so that the bottoms product will be devoid or substantially devoid of unreacted ester reactant and alcohol and the overhead product will be devoid or substantially devoid of the desired condensation product. In still more specific embodiments, and illustrated by practice of the invention embodied herein for separation and recovery of ethyl acetoacetate from neutralized starting mixtures as aforedescribed, the starting mixture is subjected to distillation in a vertically disposed distillation column wherein the molar reflux ratio in the upper portion of said column zone is maintained at from about 2:1 to about 10:1 and the molar stripping ratio in the bottom portion of said zone is maintained in the ratio of from about 2:1 to about 9:1 and preferably from about 3:1 to about 6:1. Hence, by practice of this invention, a method is provided wherein the desired condensation product (e. g., ethyl acetoacetate) in the form of an aqueous solution with the salt formed in the neutralization treatment is recovered substantially devoid of unreacted ester reactant and alcohol. An important aspect of this invention is that by carrying out the process embodied herein, wherein the distillation is carried out in presence of water and the salt formed in the neutralization, no substantial, if any, loss of the desired condensation product due to hydrolysis occurs. Thus, practice of this invention obviates the need for use of vacuum distillation for substantially complete separation of unreacted ester from the desired condensation product thereby enabling recovery of both the desired condensation product and the unreacted ester with minimized losses thereof.

The aqueous solution of the desired condensation product obtained from a distillation treatment as aforedescribed may, for separation of the desired condensation product from the aqueous solution, be subjected to treatment in any of several ways to effect such separation. For example, to separate the ethyl acetoacetate from its aqueous solution with the salt, the separation may be carried out as a stripping operation without substantial, if any, rectification and from which stripping operation the ethyl acetoacetate may be recovered as an overhead product in aqueous solution. Such an overhead product may be subjected to distillation in a column equipped with a suitable reflux means, a condenser and separator whereby the overhead aqueous mixture is condensed to form an aqueous layer which is returned to the column and an oil layer comprising ethyl acetoacetate. If desired, such an oil layer may be subjected to further treatment by conventional means such as vacuum distillation to obtain ethyl acetoacetate in substantially dehydrated form. In another method the aqueous solution of ethyl acetoacetate and the salt may be subjected to distillation in a distillation column equipped with suitable reflux, condensing, separating and decanting means whereby the ethyl acetoacetate can be obtained directly as an oil layer from the decanting means without need for recourse to a subsequent concentrating step to obtain substantially pure ethyl acetoacetate.

In order to further describe the invention, the following embodiments are set forth wherein, for purposes of illustration, the starting mixture employed consisted of a two-phase mixture, comprising an aqueous phase and an oil phase, obtained by neutralizing with a 5% sulfuric acid solution a condensation reaction mixture comprising sodio ethyl acetoacetate, ethanol and ethyl acetate obtained by condensing an excess of ethyl acetate with metallic sodium in conventional manner for preparation of ethyl acetoacetate. In such a starting mixture, the aqueous layer contained 0.99% and the oil layer contained 15.04% by weight of ethyl acetoacetate.

Example 1

A portion of the aforesaid aqueous layer and oil layer were simultaneously introduced into an intermediate point of a distillation column (equipped with reflux means and provisions for direct heating by steam), over a three hour period at the rate of 1614 grams of aqueous layer and 1194 grams of oil layer per hour with simultaneous introduction of 876 grams per hour of steam at the feed zone and 660 grams per hour of steam at the bottom of the column, thereby providing a temperature of approximately 68-70° C. at the top of the column. From such a distillation operation, a mixture of ethyl acetate, ethanol and water was withdrawn as overhead from the column at the rate of 1142.7 grams per hour and which contained only 0.29% by weight of ethyl acetoacetate.

As a bottoms product from the distillation column, there was withdrawn a solution of ethyl acetoacetate, water and sodium sulfate. The bottoms product was fed into the intermediate portion of a second distillation column into which steam was introduced at the bottom at the rate of 2202 grams per hour to provide a temperature of approximately 97.7° C. at the top of the column. From such an operation, an overhead product was condensed in an amount of 1892.3 grams per hour containing 9.23% by weight of ethyl acetoacetate. Bottoms product withdrawn from the column at the rate of 3284 grams per hour contained only 0.21% by weight of ethyl acetoacetate. Thus, of the total amount of ethyl acetoacetate subjected to the aforedescribed treatment, 99.4% was accounted for from the aforesaid process, thereby illustrating the excellent recovery obtained and evidencing that substantially none, if any, of the ethyl acetoacetate in the neutralized starting mixture was decomposed or otherwise lost in the described processing for its recovery. Upon subjecting the condensed overhead product to fractional distillation for removal of water, ethyl acetoacetate of 99.1% purity was obtained.

Example 2

Another portion of the aqueous layer and oil layer of the defined neutralized starting mixture was simultaneously fed to the intermediate portion of a distillation column over a two hour period at the rate of 1578 grams of water layer per hour and 1147 grams of oil layer per hour with simultaneous introduction of steam into the feed zone at the rate of 810 grams per hour and to the bottom of the column at 600 grams per hour, thereby providing a temperature of 71.5° C. at the top portion of the column. Bottoms product from the column was withdrawn at the rate of 1138 grams per hour and passed to a second distillation column equipped with refluxing, condensing, separating and decanting means. Steam was fed into the bottom of the second column at the rate of 2310 grams per hour. A mixture of water and ethyl acetoacetate withdrawn as overhead was condensed, separated into a water layer and an oil layer. The water layer was returned to the column and the oil layer was withdrawn at the rate of 157.4 grams per hour containing 92% by weight of ethyl acetoacetate thereby providing an overall accounting of 101.1% based on the amount of ethyl acetoacetate in the starting neutralized mixture subjected to the described separation and recovery system.

As is apparent from the foregoing description of the invention, a process is provided for improved separation and recovery of desired condensation products, by-products and unreacted ester reactant from neutralized mixtures as aforedescribed. By practice of the process embodied herein the need for vacuum distillation of the oil layer (which contains the condensation product, salts, unreacted esters, some water and alcohol) is obviated, as is the need for separate treatment (e. g., solvent extraction) of the aqueous layer for recovery of desired constituents thereof. Moreover, in the process embodied herein, the desired condensation product (e. g. ethyl acetoacetate) need not at any time be subjected to relatively high temperatures in presence of salts, tars, etc. while, at the same time, resulting in recovery of the condensation product in high yields and of excellent purity characteristics. Thus, problems and difficulties encountered in methods hereinbefore employed for separation and recovery of the desired constituents of the neutralized mixtures are obviated or substantially minimized by the process of this invention.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for the preparation of ethyl acetoacetate by condensation of ethyl acetate with an alkaline condensing agent, and subsequently neutralizing the condensation reaction mixture with a mineral acid to produce a neutralized reaction mixture which contains ethyl acetoacetate, unreacted ethyl acetate, ethanol, and a salt formed in the neutralization, the improvement which comprises distilling the entire neutralized condensation reaction mixture in the presence of a sufficient amount of water and under distillation conditions to produce an aqueous overhead distillate stream comprising unreacted ethyl acetate, and ethanol, and substantially free of ethyl acetoacetate and an aqueous bottoms stream comprising ethyl acetoacetate and said salt, and substantially free of ethyl acetate, and recovering ethyl acetoacetate from said bottoms stream.

2. In a process for the preparation of ethyl acetoacetate by condensation of an excess of ethyl acetate with a sodium-containing condensing agent, and subsequently neutralizing the condensation reaction mixture with an aqueous solution of a mineral acid to produce a neutralized reaction mixture which contains ethyl acetoacetate, unreacted ethyl acetate, ethanol, and a sodium salt formed in the neutralization, the improvement which comprises distilling the entire neutralized condensation reaction mixture in the presence of a sufficient amount of water in a distillation zone wherein a molar reflux ratio of from about 2:1 to 10:1 is maintained in the upper portion of said zone and a molar stripping ratio of from about 2:1 to 9:1 is maintained in the bottom portion of said zone, to produce an aqueous overhead distillate stream comprising unreacted ethyl acetate and ethanol and substantially free of ethyl acetoacetate, and an aqueous bottoms stream comprising ethyl acetoacetate and said salt and substantially free of ethyl acetate, and recovering ethyl acetoacetate from said bottoms stream.

References Cited in the file of this patent

UNITED STATES PATENTS

| | | |
|---|---|---|
| 1,425,626 | Backhaus | Aug. 15, 1922 |
| 1,798,937 | Halbig et al. | Mar. 31, 1931 |
| 1,805,281 | Halbig et al. | May 12, 1931 |
| 2,379,104 | Roberts | June 26, 1945 |
| 2,508,911 | Garner et al. | May 23, 1950 |

OTHER REFERENCES

B. I. O. S. Final Report #1054 (1946).